March 17, 1925.

W. H. PRATT

METER DRAG MAGNET

Filed Aug. 11, 1922

1,530,323

Inventor:
William H. Pratt,
by Albert S. Davis
His Attorney.

Patented Mar. 17, 1925.

1,530,323

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

METER DRAG MAGNET.

Application filed August 11, 1922. Serial No. 581,181.

*To all whom it may concern:*

Be it known that I, WILLIAM H. PRATT, a citizen of the United States, residing at Lynn, county of Essex, State of Massachusetts, have invented certain new and useful Improvements in Meter Drag Magnets, of which the following is a specification.

My invention relates to meter magnets and more particularly to the structure of damping magnets for induction type meters.

It has long been the practice to construct meter damping magnets in the form of one or more C-shaped pieces of permanent magnet steel. The opening in the C constitutes the air gap thru which the meter disc of conducting material rotates to produce a damping effect in a well understood manner. The damping magnet as thus constructed affords no practicable method of accurately cutting or adjusting the air gap. One object of my invention is to provide a damping magnet of such structure that the air gap may be readily and accurately cut and adjusted.

It is sometimes an advantage to have different portions of a damping magnet made of material of relatively different coercivity, an advantage which cannot be obtained where the magnet is made of a single piece of material. Another object of my invention is to provide a damping magnet made up of separate portions of magnetic material having the desired magnetic coercivity.

Figure 1:
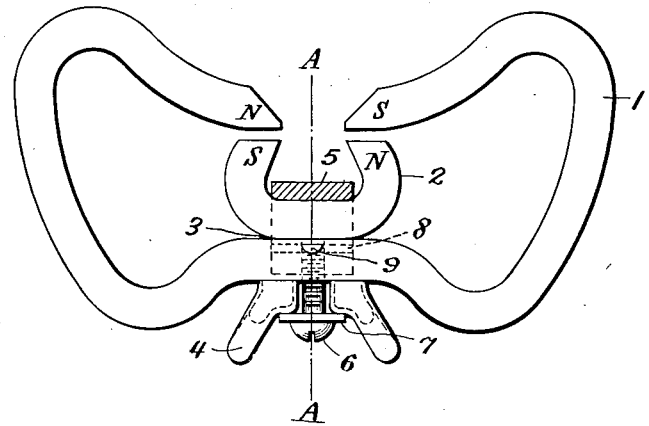
Figure 2:
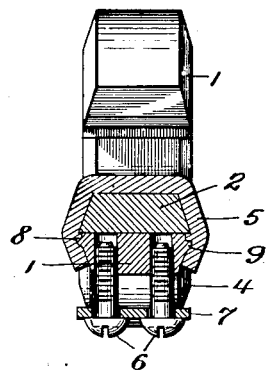
Figure 3:
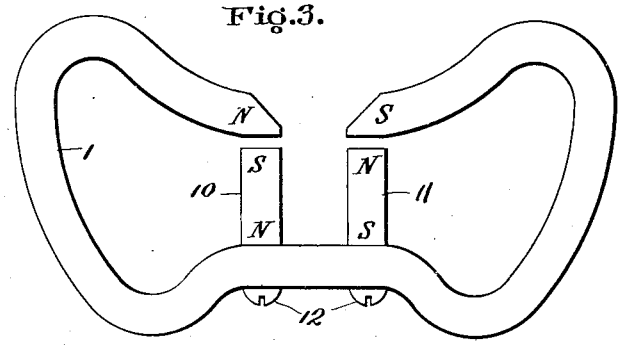

The features of my invention which I believe to be novel and patentable will be pointed out in the claims appended hereto. The manner of carrying my invention into effect and the details of construction of a magnet built in accordance with my invention will now be explained in connection with the accompanying drawings in which Fig. 1 illustrates the structure of a magnet built in accordance with my invention; Fig. 2 is a cross section taken on line A—A of Fig. 1; and Fig. 3 shows a further modification of my invention.

In previous types of damping magnets it will be evident that in order to grind the air gap in which the meter disc is to rotate, use must be made of very thin grinding wheels. Thin grinding wheels are expensive to use as their breakage is high and the work of grinding must be carried on at a slow rate. Furthermore, it is difficult to obtain an accurate definite air gap where the space available for grinding or machining is so small.

In order to overcome this objection I provide a magnet structure divided into sections each of which may be ground with robust grinding wheels and thereafter assembled to obtain an accurate definite air gap. Referring to Figs. 1 and 2, I show my invention applied to a double magnet made in two sections, 1 and 2. The smaller section 2 is removable whereby the air gap section of both surfaces may be accurately ground with robust grinding wheels. The abutting surfaces 3 of the two sections may also be accurately ground in the same manner. The two sections are secured together by means of a strap 5 and to the magnet shelf or support 4 by screws 6 and washer 7. The strap 5 is provided with a groove 8 into which fits a bead 9 provided on section 1 as shown in Figs. 1 and 2. Section 2 together with strap 5 may be removed by sliding said parts relative to section 1 until groove 8 is disengaged from bead 9. A tightening of screws 6 clamps the two sections to the support 4. Other appropriate fastening means may be provided instead of the structure shown. Should it become necessary to grind the surfaces an excessive amount to make them even, thereby making the air gap too great, the air gap may be corrected by placing shims between the surfaces 3. The shims, if such are necessary, and likewise the strap 5 may be made of magnetic material such as mild steel or one may be made of magnetic material and the other of brass. The strength of the magnetic field across the air gap may be adjusted to some extent in this manner.

It will be noticed that the length of the magnetic paths between opposite poles in the two sections 1 and 2 are considerably different and therefore it will be an advantage to make the section 2 of a higher magnetic coercivity than section 1. To this end I find it desirable to use ordinary magnetic steel for section 1 and cobalt steel for section 2. It is possible to adjust the damping effect produced by interchanging section 2 for another section of similar dimensions having a greater or smaller permanent magnetism.

In Fig. 3 I have shown another modification of my invention where the double damping magnet is made of three pieces, consisting of a section 1 similar to that shown in Fig. 1, and two removable straight sections 10 and 11. The sections 10 and 11 are preferably secured to the section 1 by screws 12 and these sections may, if desired, be made adjustable toward and away from each other to vary the damping effect produced. Various lengths of the pieces 10 and 11 may be kept in stock and thus any desired air gap may be readily obtained by interchanging these pieces for others of a different length. These pieces will be permanently magnetized. In Figs. 1 and 2 the polarity of the permanent magnet sections are indicated by the letters N and S. While I have shown the structure in Fig. 3 as a double magnet, each C-shaped section may be made separate.

In accordance with the provisions of the patent statutes, I have described what I now consider to represent the best embodiment of my invention but I desire to have it understood that the structures shown are only illustrative and that the invention may be carried out by other modifications thereof.

What I claim as new and desire to secure by Letters Patent of the United States is:

1. A drag magnet for meters comprising a C-shaped permanent magnet section of cobalt steel and a relatively longer permanent magnet section of ordinary magnet steel bent to a shape to enclose the C-shaped section so that the north and the south ends of one section form narrow air gaps with the south and north ends respectively of the other section, and means for securing said sections together.

2. A drag magnet for meters comprising a C-shaped permanent magnet section and a relatively longer permanent magnet section of lower coercivity than the first mentioned section bent to a shape to enclose the C-shaped section so that the north and south ends of one section form narrow air gaps with the south and north ends respectively of the other section and means for securing said sections together.

3. A damping magnet for electric meters comprising a plurality of permanent magnet sections, said sections having different degrees of magnetic coercivity.

4. A magnetic structure made up of two sections of permanent magnetic material forming a drag magnet, one section having a shorter continuous magnetic path and made of material having a greater degree of magnetic coercivity than said other section.

In witness whereof, I have hereunto set my hand this 9th day of August 1922.

WILLIAM H. PRATT.